Figure 1:
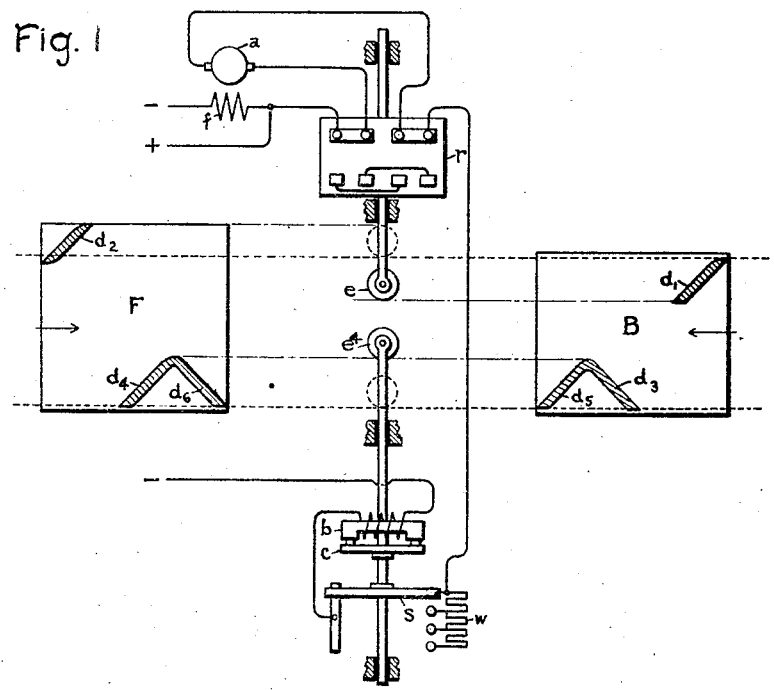

W. NAUMANN.
MOTOR CONTROL.
APPLICATION FILED APR. 14, 1910.

1,031,573.

Patented July 2, 1912.
2 SHEETS—SHEET 1.

Witnesses:

Inventor
Wilhelm Naumann,
by Albert G. Davis
His Attorney.

W. NAUMANN.
MOTOR CONTROL.
APPLICATION FILED APR. 14, 1910.

1,031,573.

Patented July 2, 1912.

2 SHEETS—SHEET 2.

Witnesses:

Inventor
Wilhelm Naumann,
by Albert G. Davis
His Attorney.

UNITED STATES PATENT OFFICE.

WILHELM NAUMANN, OF PANKOW, GERMANY, ASSIGNOR TO GENERAL ELECTRIC COMPANY, A CORPORATION OF NEW YORK.

MOTOR CONTROL.

1,031,573. Specification of Letters Patent. Patented July 2, 1912.

Application filed April 14, 1910. Serial No. 555,440.

*To all whom it may concern:*

Be it known that I, WILHELM NAUMANN, a subject of the Emperor of Germany, residing at Pankow, Germany, have invented certain new and useful Improvements in Motor Control, of which the following is a specification.

My invention relates to the control of electric motors driving planers or other machines having a reciprocating movement.

It is the object of my invention to provide a novel and simple arrangement of the controlling system and of the automatic means for actuating them to stop, reverse and accelerate the motor as the machine finishes its travel in each direction.

For motors of any size which drive reciprocating loads and which are stopped and reversed periodically, it is necessary to employ a starting resistance, because, if the motor were reversed without resistance in the circuit, the current flow to the motor before the motor stopped would be greater than if the current were suddenly applied to the motor while at rest. It has been proposed heretofore in such automatic reversing devices to employ alternately two electromagnetically actuated motor starters in such a manner that one of them makes the connections for forward driving and the other for backward. There are also well known in the art regulating devices which have separate reversing and starting switches which are moved by the driving mechanism through magnetic or friction clutches. The first mentioned arrangement of two complete electromagnetically actuated starters requires a large amount of apparatus and the starting period does not adapt itself to varying loads if the retardation of the movement of the starter is uniform. For different loads the momentum is different and with a starter operating uniformly the motor is sometimes overworked in reversing and at other times the reversal takes longer than it should. The second arrangement, that of having a mechanically actuated reversing switch and a separate starting switch, ordinarily has the disadvantage that the starting resistance for forward travel is short circuited from one side of the row of resistance steps and for backward travel is short circuited from the other side so that the resistance regulation must be such that the largest steps are in the middle of the row with resistance steps symmetrically decreasing toward both sides. The starter, therefore, must have practically twice as many steps as are necessary if the starting is so performed that the largest steps are always short circuited at the beginning and the smallest at the end. Furthermore, time is unnecessarily consumed in reversing the motor with this arrangement.

By my invention I provide means driven by the load for actuating the motor controlling switch contacts as the load approaches the end of its travel in either direction to stop and reverse the motor and means driven by the load for actuating the switch contacts upon the beginning of the return movement to accelerate the motor.

My invention will be understood by reference to the following specification taken in connection with the accompanying drawings, in which—

Figure 7:
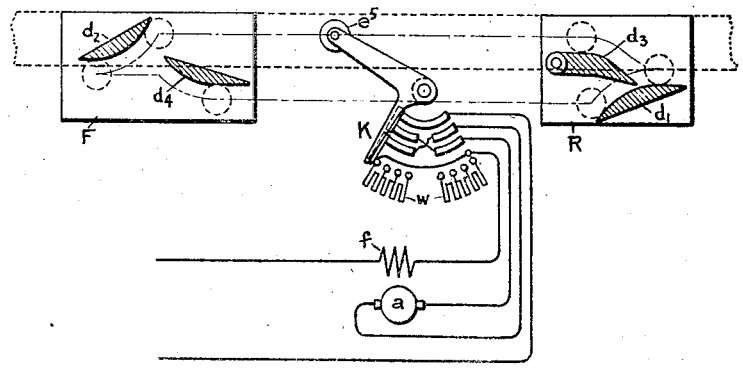
Figure 2:
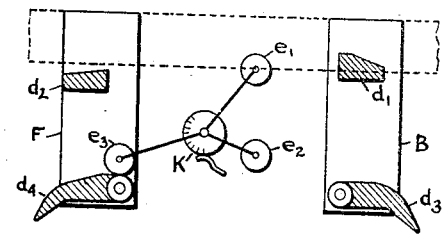
Figure 6:
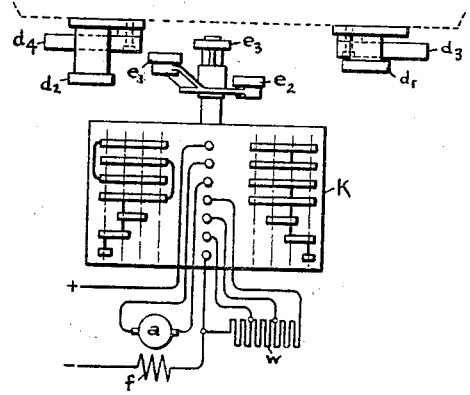
Figure 3:
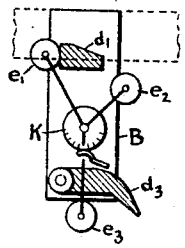
Figure 4:
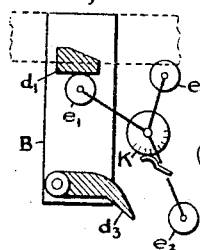
Figure 5:
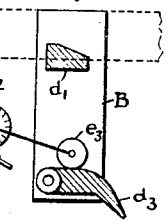

Figure 1 shows diagrammatically motor controlling means arranged in accordance with my invention; Fig. 2 shows diagrammatically another form of embodiment of my invention; Figs. 3, 4 and 5 show the devices of Fig. 2 in the different positions occupied during the reversal of the motor; Fig. 6 shows a plan view of the devices of Fig. 2; and Fig. 7 shows still another form of embodiment of my invention.

In Fig. 1 a reversing device is shown in which the switch member $r$ for reversing the motor is separated from the switch member $s$ which controls the resistances $w$ for starting the motor.

$a$ represents the armature of the motor and $f$ its field.

In the drawing the starting device is shown in a position which corresponds to the backward operation of the machine at full speed, when the resistance $w$ is entirely cut out of circuit. It is assumed that the switch $s$ tends to take its lower position by gravity but is held in the position shown by means of an electromagnet $b$ with its armature $c$ as long as the electromagnet, connected in series with the motor armature $a$, is excited. The reversing switch $r$ is supposed to remain in any position to which it is moved. Upon the driven machine, as for instance the planer, are placed two adjustable carriers F and B upon which are a series of inclined planes $d_1$ to $d_4$ which coöperate with the rollers $e$ and $e^4$ connected to the reversing switch $r$ and the starting switch $s$ respectively.

The method of operation toward the end of the backward movement is as follows: As soon as the inclined plane $d_1$ of the carrier B engages the roller $e$, the reversing switch $r$ is raised from the position shown to its other position so as to reverse the armature connections of the motor. In passing from one position to the other, the switch $r$ opens the motor circuit so that magnet $b$ is de-energized and releases its armature $c$ allowing the starting switch $s$ to drop to its lowest position. The continued movement of the machine while the switch $r$ is moving through its mid or off position is due to the momentum of the machine and of the motor. When the switch $r$ reaches its other position the motor is reversely connected to the source with all the resistances $w$ in series with the armature and a reverse torque is consequently produced in the motor which retards, stops and reverses the motor. The resistance $w$ is of sufficient amount to limit the current to its proper value during this operation. After the motor has started to drive the machine forward on the return stroke, the inclined plane $d_3$ engages the roller $e^4$ and raises the switch $s$ so as to cut out the resistance $w$ gradually. When the switch $s$ is returned to the position shown in Fig. 1, it is held in that position by the electromagnet $d$ until the machine reaches the other limit of its travel when a similar operation of the switches take place by means of the inclined plane $d_2$ and $d_4$.

If it is desired to provide for a possible interruption of the current while the machine is in the middle of its travel, which would cause the switch $s$ and roller $e^4$ to drop to their lowest positions, additional inclined planes may be provided as indicated at $d_5$ and $d_6$ to lift the roller $e^4$ out of the way of the members $d_3$ and $d_4$.

Figs. 2 to 6 show another form of embodiment, only the starting and reversing contacts instead of being separated are combined in a single switch K. The off position of this switch is in the middle, as shown in Fig. 6, where the contacts are indicated on a plane surface. On opposite sides of the off position are starting, accelerating and running positions for opposite directions of rotation. The four upper contacts are the reversing contacts and the three lower the starting contacts. The adjustable carriers F and B on the driven machine carry actuating members $d_1$ to $d_4$ as in Fig. 1, but in Fig. 2 the members $d_1$, $d_2$ are not inclined on their actuating surfaces, while the members $d_3$, $d_4$ are both pivoted. The switch K which is of the rotary drum type is provided with three arms $e_1$, $e_2$, $e_3$. The member $d_1$ actuates the arm $e_1$, the member $d_2$ actuates the arm $e_2$ and the arm $e_3$ is actuated by both the members $d_3$ and $d_4$. If different speeds are desired for forward and backward movement the arms $e_1$ and $e_2$ may be of different lengths as shown.

Fig. 2 shows the starter in position for full backward travel. The member $d_1$ approaches the arm $e_1$ until the two meet and the starter is then rotated from its running position for backward rotation through its off position to the first starting position for forward rotation. This last position is indicated in Fig. 4, the off position of the starter being indicated at Fig. 3. When the starter is in the position shown in Fig. 4 the motor is supplied with current which produces a reverse torque and the motor is therefore retarded, stopped and reversed. In passing from the position of Fig. 3 to that of Fig. 4, the roller on the end of arm $e_3$ passes under the member $d_3$ which lifts on its pivot to permit the roller to pass. As soon as the momentum has been overcome, the machine is driven forward and the member $d_3$ is brought into engagement with the roller $e_3$. As the roller moves over this member, as shown in Fig. 5, the movement of the starter is continued from the first starting position through the accelerating to the running position so that the load is automatically accelerated. In similar manner the reversal from forward to backward movement is accomplished at the other end of the limit of travel of the machine.

In Fig. 7 is shown still another embodiment which is similar to that of Figs. 2 to 6, except that only a single roller $e^5$ is employed. The movable switch member $k$ is shown as comprising a pivoted arm. In this figure the starter is shown in the position in which the adjustable carriers F and R are moving forward at full speed. As the limit of travel is approached, the member $d_2$ is brought into engagement with roller $e^5$ as indicated in dotted lines and the roller is carried downward by traveling along the under surface of this member until the switch arm $k$ has been moved through the mid or off position to the first starting position on the other side of off position. When the backward movement is begun the roller strikes the under surface of the member $d_4$, the roller is pushed farther down and the switch arm $k$ is moved gradually to the full running position for backward rotation. At the other end of the stroke the switch arm is returned to the position shown by a similar series of operations. In order to shorten the time of reversal the member $d_3$ is pivoted so as to allow the roller to pass beneath it as the machine approaches the end of its stroke. By means of this arrangement the member $d_3$ may be made to engage the roller more promptly after return movement has begun than is possible if the member is fixed, as shown at $d_4$, so that the time used for reversal is less.

I do not desire to limit myself to the particular construction and arrangement of parts shown and described but aim in the appended claims to cover all modifications which are within the scope of my invention.

What I claim as new and desire to secure by Letters Patent of the United States, is,—

1. In combination with an electric motor and a reciprocating load driven thereby, switch contacts for starting and reversing the motor, said reversing switch contacts having a mid position in which the motor circuit is open, and two pairs of actuating members driven by the load for engaging and actuating said switch contacts at opposite ends of the travel of the load respectively, one actuating member of each pair engaging and actuating the switch contacts as the load approaches the end of its travel to move the reversing contacts from one running position through off position to the other running position and the starting contacts from running position to first starting position, whereby the motor is given a reverse torque to stop and to reverse the load, and the other actuating member of the pair engaging and actuating the switch contacts as the load begins its return movement to move the starting contacts from first starting position to running position, whereby the return movement of the load is gradually accelerated.

2. In combination with an electric motor and a reciprocating load driven thereby, switch contacts for starting and reversing the motor, and two pairs of actuating members driven by the load for engaging and actuating said switch contacts at the opposite ends of the travel of the load respectively, one actuating member of each pair engaging and actuating the switch contacts as the load approaches the end of its travel to stop and reverse the motor, and the other member of the pair engaging and actuating the switch contacts as the load begins its return movement to accelerate the motor, the last mentioned member being movable in one direction on its support so as to yield and to pass the switch contacts without actuating them as the load is approaching the end of its travel.

3. In combination with an electric motor and a reciprocating load driven thereby, a combined starting and reversing switch for the motor having an off position and starting, accelerating and running positions on opposite sides of off position for opposite directions of rotation, means driven by the load for moving said switch from running position to the starting position on the other side of off position when the load approaches either end of its travel, and means driven by the load for continuing the movement of the switch to accelerating and running positions when the load has begun its return movement.

4. In combination with an electric motor and a reciprocating load driven thereby, a combined starting and reversing switch for the motor having an off position and starting, accelerating and running positions on opposite side of off position for opposite directions of rotation, and two pairs of actuating members driven by the load for engaging and actuating said switch at opposite ends of the travel of the load respectively, one actuating member of each pair engaging the switch as the load approaches the end of its travel and moving it from running position to the starting position on the opposite side of off position, and the other member of the pair engaging the switch as the load begins its return movement and continuing the movement of the switch to the accelerating and running positions.

In witness whereof, I have hereunto set my hand this 24th day of March, 1910.

WILHELM NAUMANN.

Witnesses:
LEOPOLD JANISCH,
FRIEDRICH EICHBY.